May 21, 1963  H. A. PALMER  3,090,498
LOADING AND UNLOADING APPARATUS
Filed July 20, 1959  8 Sheets-Sheet 1

INVENTOR.
HARRY A. PALMER
BY
Whittemore, Hulbert & Belknap
ATTORNEYS

May 21, 1963 H. A. PALMER 3,090,498
LOADING AND UNLOADING APPARATUS
Filed July 20, 1959 8 Sheets-Sheet 2
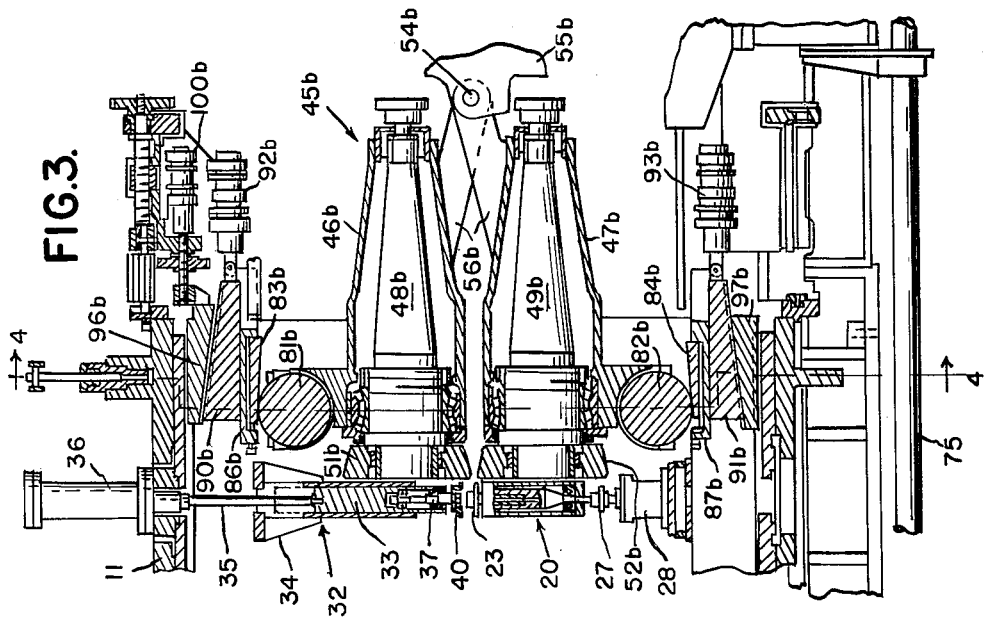
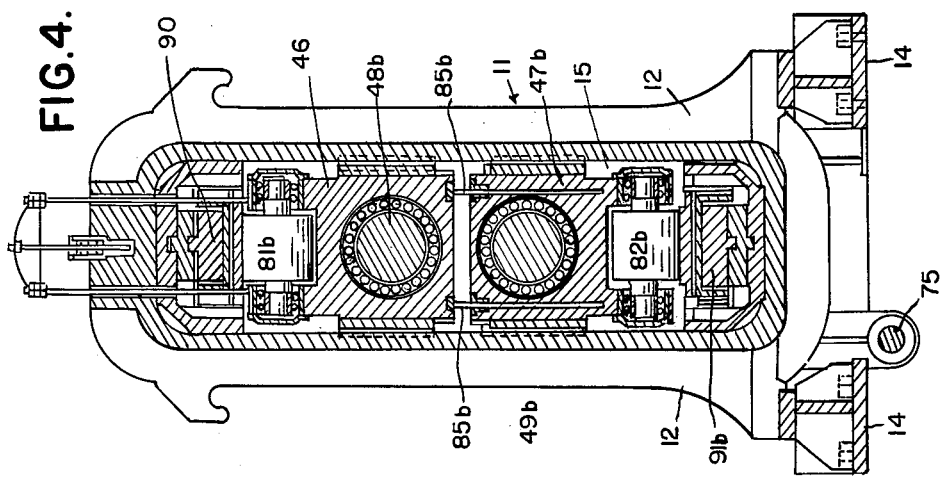
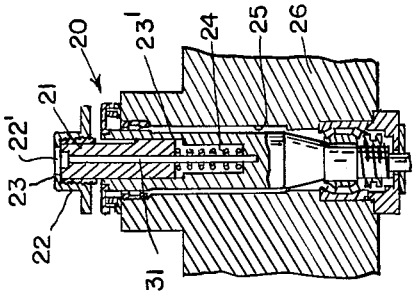
INVENTOR.
HARRY A. PALMER
BY
*Whittemore, Hulbert & Belknap*
ATTORNEYS May 21, 1963
H. A. PALMER
3,090,498
LOADING AND UNLOADING APPARATUS
Filed July 20, 1959
8 Sheets-Sheet 3
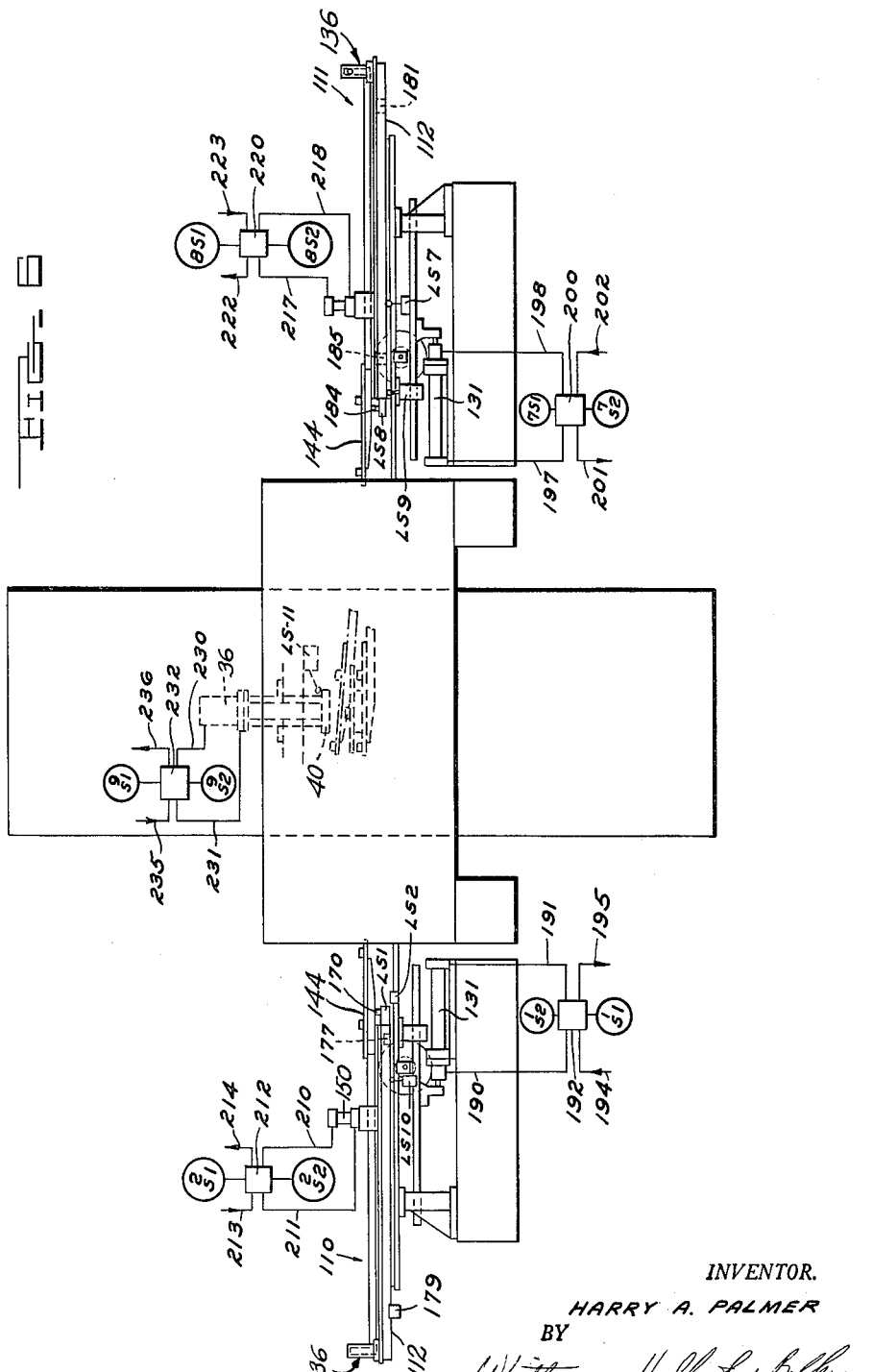
INVENTOR.
HARRY A. PALMER
BY
Whittemore, Hulbert & Belknap
ATTORNEYS

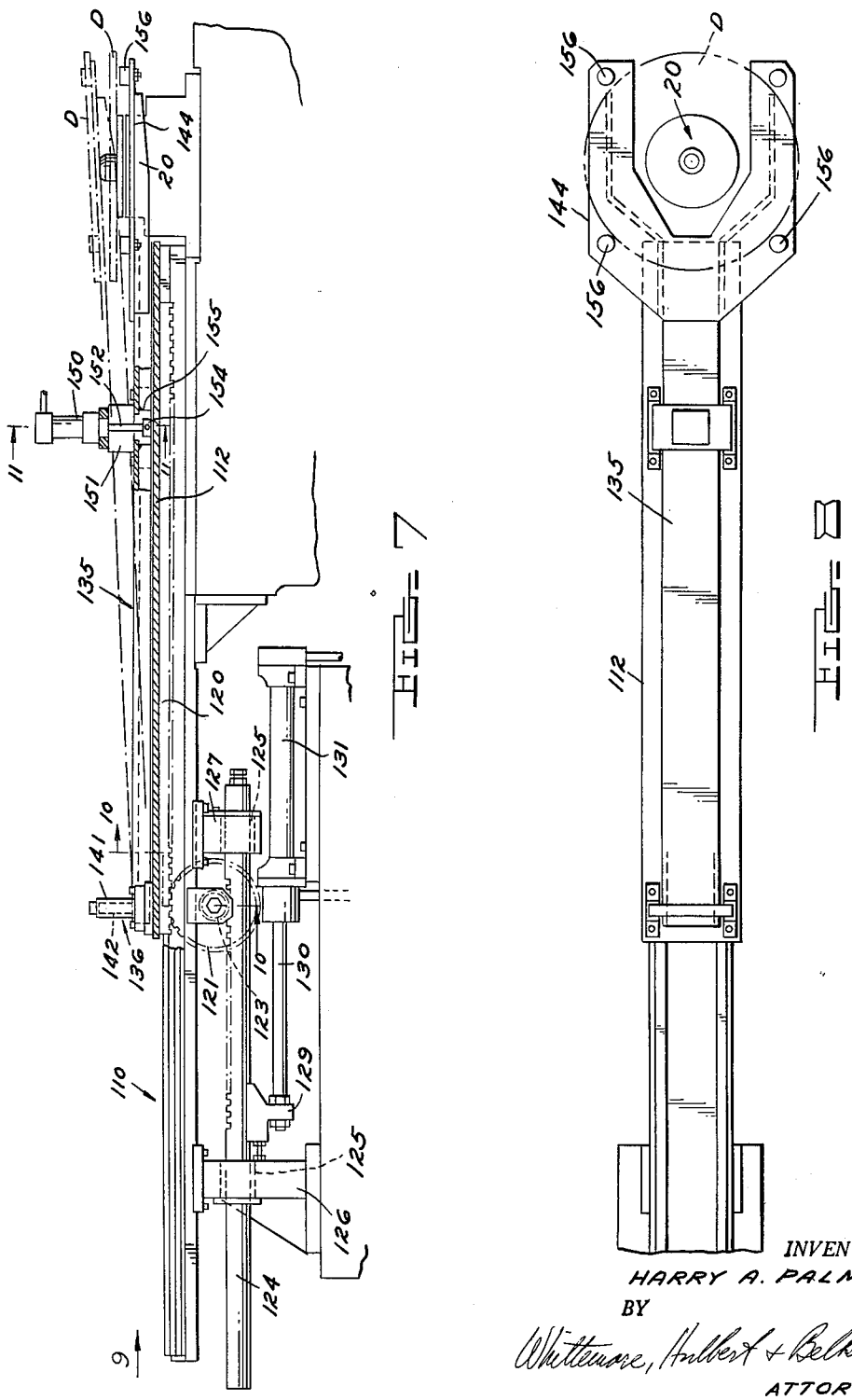

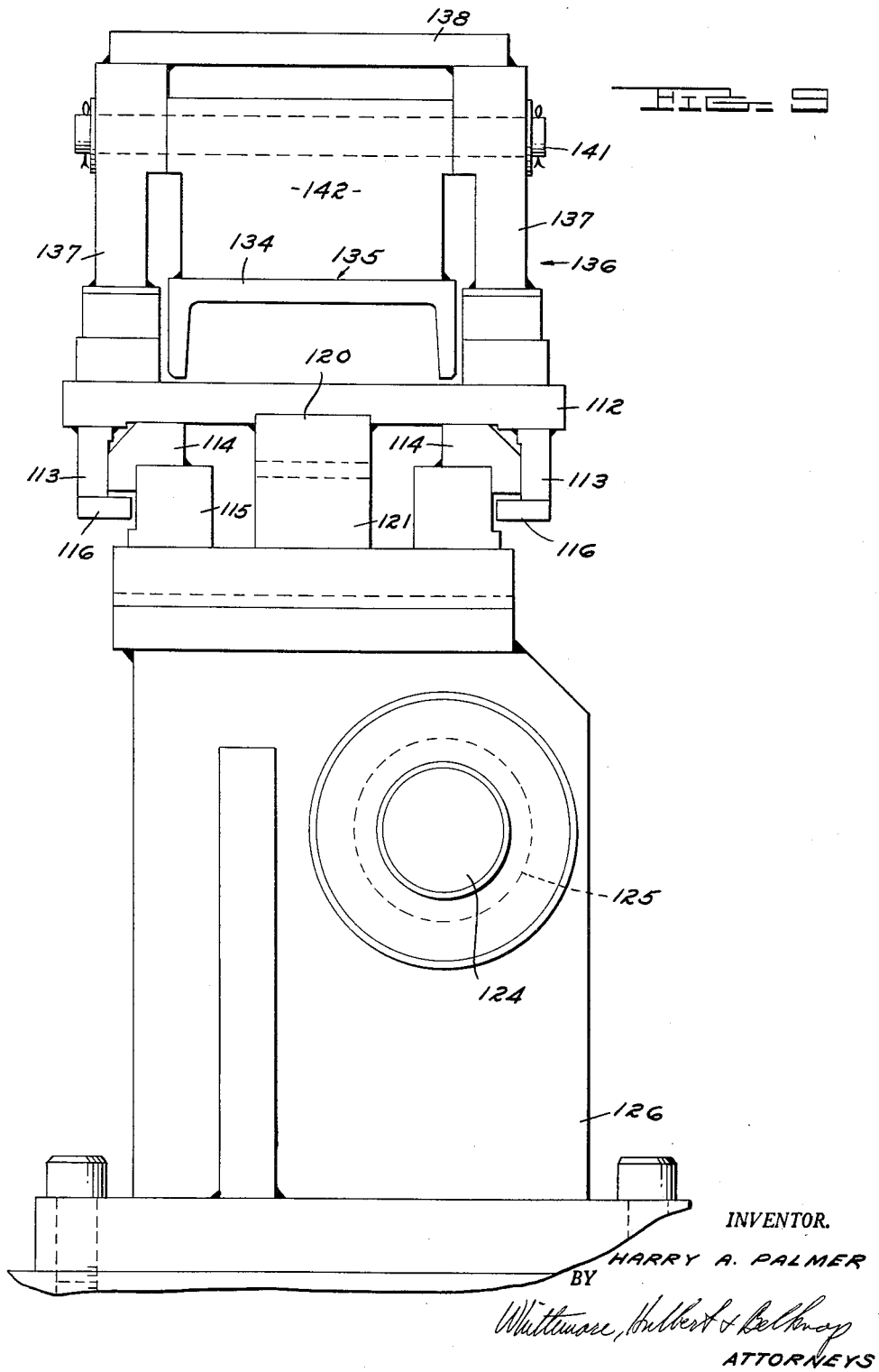

INVENTOR.
HARRY A. PALMER
BY
ATTORNEYS

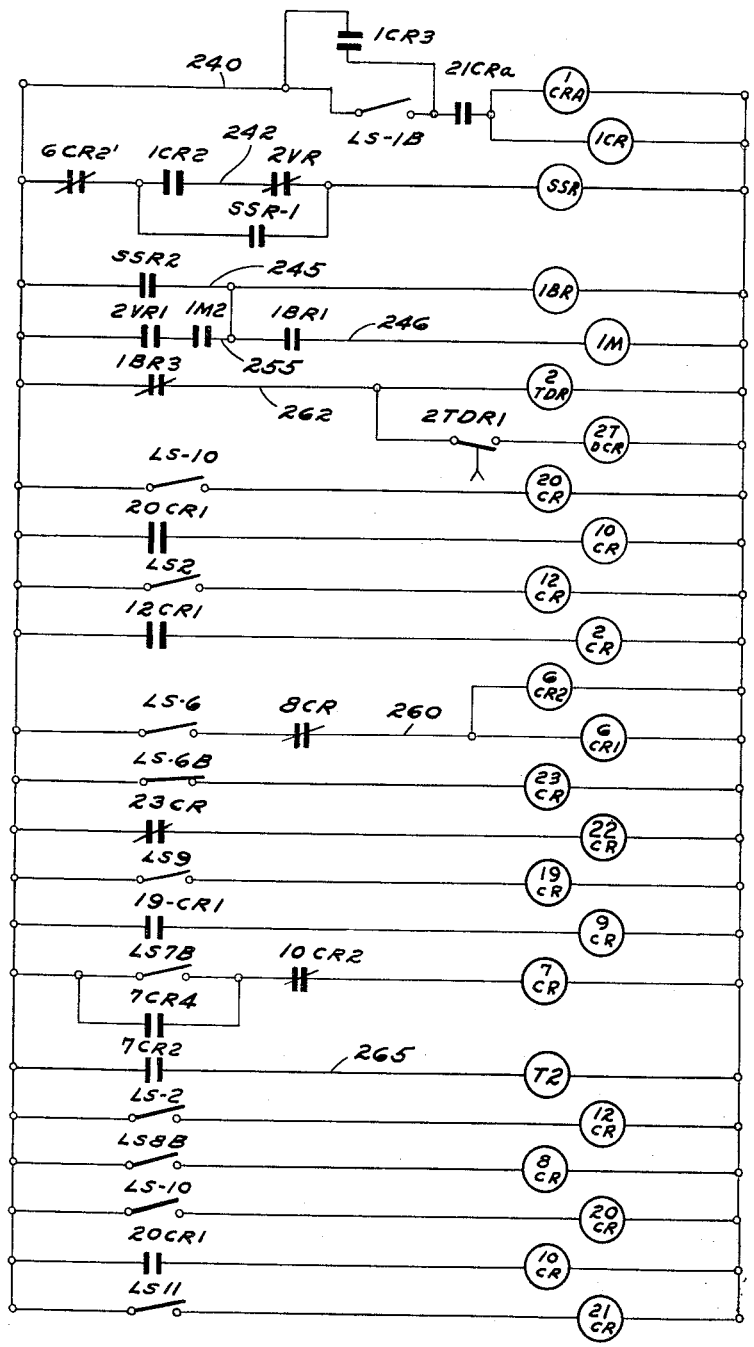

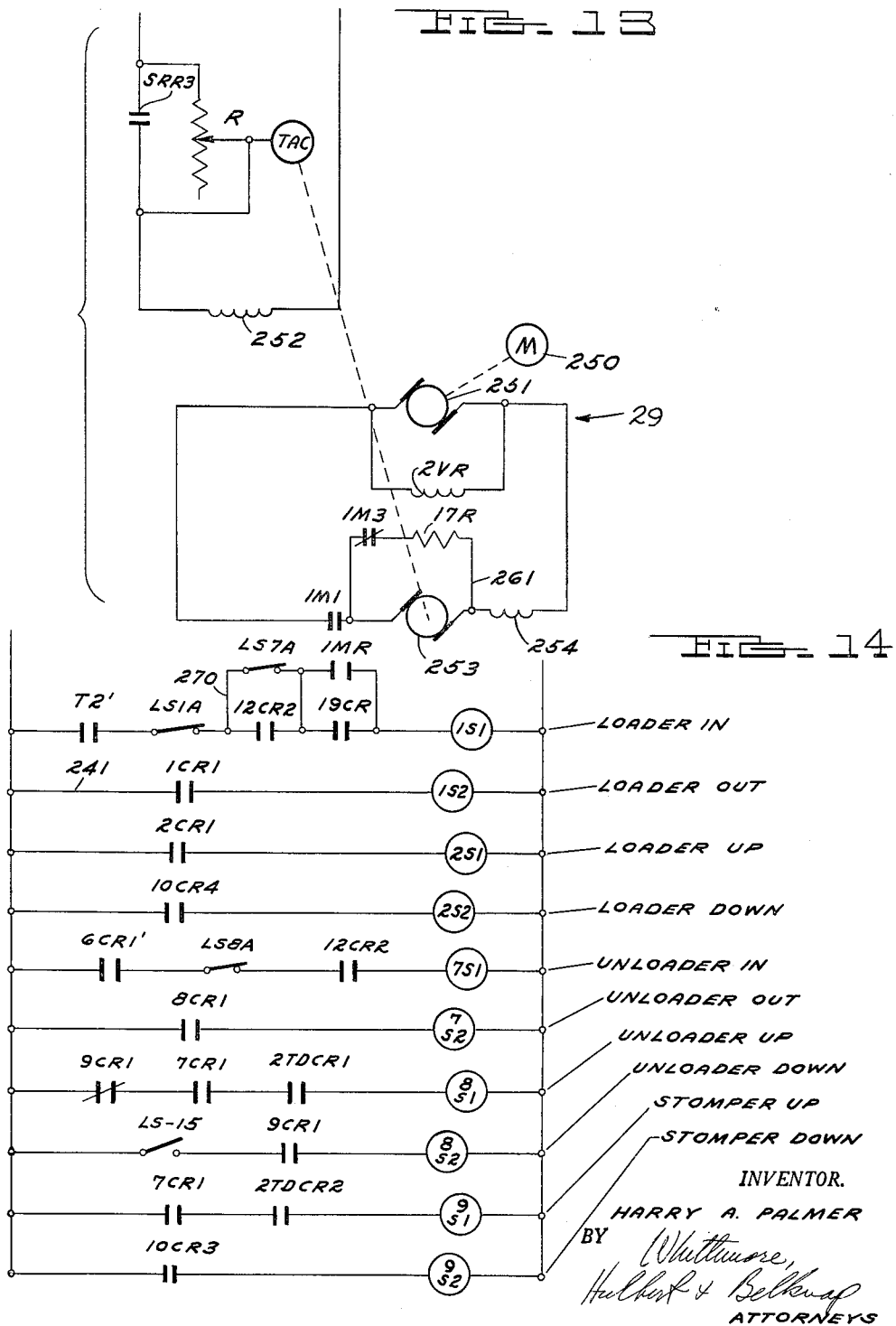

United States Patent Office 3,090,498
Patented May 21, 1963

3,090,498
LOADING AND UNLOADING APPARATUS
Harry A. Palmer, Birmingham, Mich., assignor to Kelsey-Hayes Company, Detroit, Mich., a corporation of Delaware
Filed July 20, 1959, Ser. No. 828,214
3 Claims. (Cl. 214—1)

This invention relates to loading and unloading apparatus and refers more particularly to loading and unloading apparatus for a rolling mill adapted to roll disks to a tapered contour for use in the manufacture of vehicle wheels.

The invention has for one of its objects to provide loading and unloading apparatus which is fast operating and automatic.

The invention has for another of its objects to provide loading and unloading apparatus comprising a loader and an unloader which are of substantially the same construction although differing in their respective movements.

The invention has for still another object to provide loading and unloading apparatus comprising a loader and an unloader which are reciprocable to and from a work support and constructed so that overall space required for the operation of the apparaus is reduced to a minimum.

The invention has for a further object to provide a loader which comprises a reciprocable slide movable to and from a work support and having a work holder adapted to be lowered at the work support to deposit work thereon.

The invention has for another object to provide an unloader comprising a reciprocable slide movable to and from a work support and having a work holder adapted to be raised at the work support to lift work therefrom.

Other objects and features of the invention will become apparent as the description proceeds, especially when taken in conjunction with the accompanying drawings, illustrating a preferred embodiment of the invention, wherein:

FIG. 3 is a fragmentary sectional view on the line 3—3 of FIG. 1;

FIG. 4 is a sectional view on the line 4—4 of FIG. 3;

FIG. 5 is an enlarged sectional view of the work supporting spindle assembly;

FIG. 6 is a schematic view of the mill showing the loading and unloading apparatus taken at right angles of FIG. 2;

FIG. 7 is an elevational view, partly in section, of the loader;

FIG. 8 is a plan view of the loader;

FIG. 9 is an end view of the loader looking in the direction of the arrow 9 in FIG. 7;

FIGS. 12, 13 and 14 are wiring diagrams.

Figure 1:
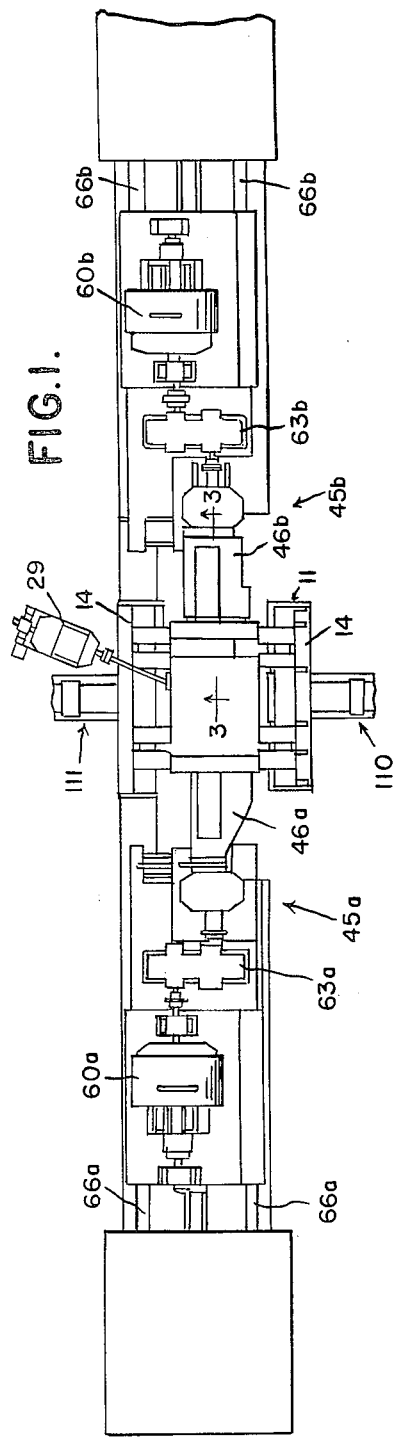
FIG. 1 is a plan view of a rolling mill having loading and unloading apparatus constructed in accordance with the invention.
Figure 2:
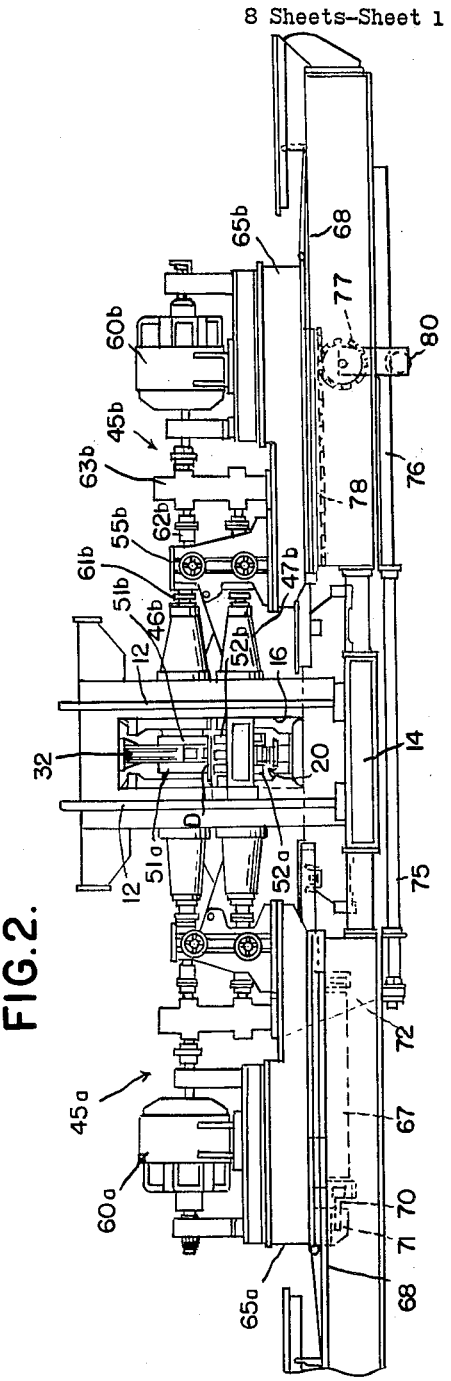
FIG. 2 is a side elevational view of the mill shown in FIG. 1 with the loader removed.
Figure 10:
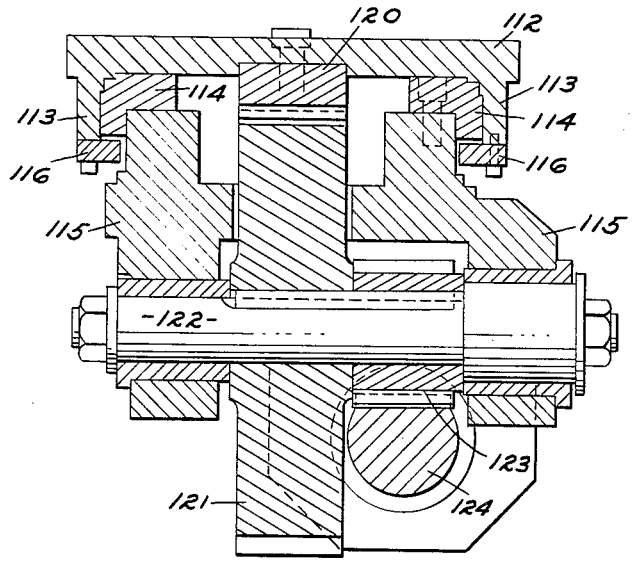
FIG. 10 is a sectional view taken on the line 10—10 of FIG. 7.
Figure 11:
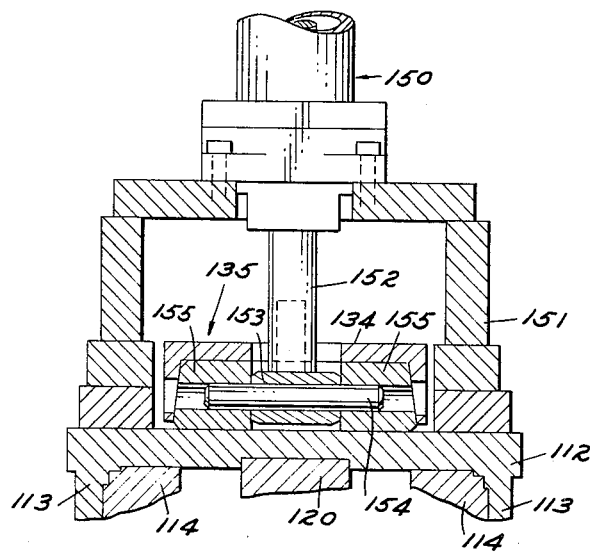
FIG. 11 is a sectional view taken on the line 11—11 of FIG. 7.

Referring now more particularly to the drawings and especially to FIGS. 1 and 2 thereof, there is illustrated a mill for rolling tapered disks which includes a housing 11 having the four corner post sections 12 supported upon and secured to the bed plates 14. The end walls of the housing are formed with openings 15 and the side walls of the housing are provided with openings 16. The housing is completed by top and bottom sections joined to the four corner post sections 12 forming an integral unit.

The mill is designed to simultaneously roll a pair of circular metal disks D placed back to back on the vertical work support or spindle assembly 20 which is disposed centrally within the housing on the vertical center line of the mill.

The work support or spindle assembly 20 comprises a vertical stem 21 having a flanged element 22 secured to the upper end thereof on which the disks rest. The central hub 23 of the element 22 receives the central opening in the disks. The lower end of the stem 21 is slidably received in a bore provided in cartridge 23', and at the bottom of the bore there is provided a compression spring 24 pressing upwardly against the stem. The cartridge is rotatably received in an opening 25 formed in a casting 26 which is secured to the housing 11. The lower end of the cartridge 23' extends beneath the casting and is connected by a coupling 27 (FIG. 3) through a gear unit 28 to a power unit 29 (FIG. 1). The stem 21 is keyed to the cartridge 23' to prevent relative rotation while permitting relative vertical sliding movement. The stem 21 is free to move vertically during operation of the mill to the extent permitted by the bolt 31 which passes freely through the stem being attached at its lower end to the cartridge and having a head at the upper end limiting upward movement of the stem. The base of hub 23 is centrally apertured at 22' to clear the head of bolt 31 and thereby permit the stem 21 to move vertically.

A hold-down assembly 32 is provided which is mounted above and coaxial with the spindle assembly. The assembly 32 comprises a plunger 33 vertically slidable in a bracket 34 and having secured to its upper end a piston rod 35 extending downwardly from the piston of a double acting cylinder 36 mounted on top of the housing 11. A hold-down shaft 37 is rotatably carried by the lower end of the plunger 33 and has a cup-like shoe 40 at the lower end engageable with the disks on the spindle assembly. The hold-down shaft is movable vertically as a unit with the plunger 33 and therefore is raised and lowered by the action of the cylinder 36.

When a pair of disk blanks are positioned on the spindle assembly and the hold-down assembly shoe 40 engages the disks, the disks may be rapidly accelerated to the proper speed for rolling by the spindle motor 29. After rolling, the disks may be rapidly decelerated with the aid of the hold-down assembly. The pressure exerted by the cylinder 36 is so controlled that it will approximately balance the force exerted by the spring 24 after the disk blanks have been placed on the spindle assembly.

The disks are rolled by the rolling units 45a and 45b respectively disposed at opposite ends of the housing 11 and adapted to extend into the housing through the openings 15. The various elements of the two rolling units are the same and hence only the unit to the right in FIG. 2 will be described. The unit to the left has its parts identified by the same reference numerals except that such numerals include the letter "a" whereas the identifying numerals for the righthand unit include the letter "b."

The unit 45b includes a pair of roll heads 46b and 47b which are disposed one above the other in the same vertical plane and have roll shafts 48b and 49b therewithin. The roll shafts are supported within the heads for axial rotation by suitable bearings and each carries a roll 51b, 52b at its inner end. The spindle and hold-down assemblies 20 and 32 are disposed in the plane occupied by 46b and 47b, and the rolls 51b and 52b cooperate to roll the pair of disks to a predetermined taper by engagement with the upper and lower sides of the pair.

The heads 46b and 47b pivot toward and away from each other about a stub shaft 54b secured to the roll support stand 55b. The heads have mounting extensions 56b supported on the pivot stub shaft 54b. The heads may thus be moved with respect to the axis of the pivot shaft 54b so as to move the rolls 51b and 52b toward or away from each other to roll the disks to the desired contour. The shafts 48b, 49b extend through the outboard ends of the heads and are driven by a motor 60b. The outboard ends of the shafts 48b, 49b are connected by universal coupling 61b through the spindles 62b to the output side of the common gear drive 63b driven by the motor 60b. The rolls 51b, 52b are driven at the same speed to impart a rotation to the disks during rolling.

The two roll units 45a and 45b are supported for movement toward and away from the spindle support, and means are provided for assuring a simultaneous equal movement thereof. Each unit is supported on a platform 65a, 65b supported for longitudinal sliding movement on suitable guides 66a and 66b which extend longitudinally of the apparatus. A double acting piston-cylinder assembly 67 is secured to a fixed sub-platform 68 and disposed longitudinally of the paths of the rolling units, and the piston rod 70 is secured by a bracket 71 to the platform 65a. Beneath the platform 65a and secured to a bracket 72 thereof, there is an equalizer tension rod 75 which passes beneath the mill toward the other unit 45b. A rack 76 is secured to the other end of rod 75 having teeth on the upper side in mesh with a gear 77 secured to the fixed sub-platform 68. A rack 78 secured to the platform 65b also meshes with the gear 77 thus assuring a simultaneous equal movement of the roll units in directions toward and away from the support. The roller 80 depending from the fixed sub-platform 68 provides an anti-friction support for the tension rod.

By moving the roll units simultaneously and equally away from the work support, and at the same time controlling the position of the rolls of each unit with respect to each other, the pair of disks may be rolled to a predetermined contour, such as a uniform taper, and the rolls of both units will engage the same portion of the disks during rolling. The roll units 45a and 45b are longitudinally movable from an inner limit adjacent to the spindle support to an outer limit beyond the periphery of the disks.

The movement of the roll heads of each unit toward and away from each other is controlled by structure which will now be described. Referring to FIGS. 3 and 4, the heads 46b and 47b carry cam rollers or followers 81b, 82b, the axes of which are at right angles to the axes of the roll shafts 48b and 49b. These cam rollers engage the wedge-shaped cams 83b, 84b. A pair of piston-cylinder assemblies 85b are carried by the roll end of the lower head 47b. The pistons of such assemblies engage the lower surface of the upper head and fluid pressure in the cylinders formed in the lower heads separates the heads and holds the cam rollers thereof in engagement with the cams 83b and 84b.

The cams 83b, 84b are carried by cam holders 86b, 87b which are held from transverse or longitudinal movement by suitable vertical guides on the housing 11. The cams can move vertically only. Wedges 90b, 91b engage cam holders 83b and 84b and are reciprocated by the piston-cylinder assemblies 92b, 93b. The wedges 90b, 91b have inclined surfaces opposite the cam holders formed with ribs engageable in grooves in the inclined surfaces of wedges 96b, 97b. The lower wedge 97b is fixed with respect to the housing and the upper wedge 96b is adjusted longitudinally by the piston-cylinder assembly 100b. The adjustment of the cylinder 100b determines the degree of taper during rolling by vertical adjustment of cam 83b, and the cylinders 92b, 93b are provided to move the associated wedges longitudinally between roll open and roll closed positions. In the roll open position, the cams 83b, 84b are separated for disengagement of the work by the rolls, and in the roll closed position the cams are moved toward one another for engagement of the work by the rolls.

The loading and unloading apparatus of the invention (FIGS. 6–11) comprises a loader 110 and an unloader 111. The loader and unloader are of the same construction although their movements are somewhat different in order to accomplish the different functions. The loader is located at the front side of the machine and the unloader at the rear side. The loader and unloader are both reciprocable longitudinally toward and away from the work spindle assembly to either load a pair of disks on the spindle assembly or to unload the rolled disks.

Since the loader and unloader are of the same construction, the same reference numerals are employed and the loader only will be described in detail. The loader will be seen to comprise a horizontal slide 112 which is reciprocable from the outer or retracted position shown in FIG. 6 to the inner or advance position of FIG. 7 in which it projects into housing 11 through an opening 16. The slide 112 is an elongated member having the laterally spaced depending guides 113 adapted to straddle the rails 114 carried by the fixed frame 115. The rails 114 are parallel and extend in the direction of movement of the slide to permit the required reciprocation of the latter. Retainers 116 are secured to the guides 113 and underlie the rails to prevent disengagement of the slide.

The slide has an elongated rack 120 secured to its underside which meshes with a gear 121 secured to the shaft 122 supported for rotation by the fixed frame 115. Also secured to the shaft 122 to one side of the gear is a pinion 123 in mesh with the teeth on the upper surface of a rod 124. The rod is supported for longitudinal sliding movement in bushings 125 carried respectively by the stand 126 and the bracket 127 depending from the fixed frame 115. The rod 124 is secured by a coupling 129 to the piston rod 130 of a hydraulic piston-cylinder unit 131 in fixed position beneath the frame of the loader. Due to the ratio between the gear 121 and pinion 123, a relatively short stroke cylinder 131 will produce the desired relatively longer loader slide stroke. Moreover, the piston-cylinder assembly 131 is disposed beneath the loader slide and does not increase the overall length of the loader.

A work holder 135 has an elongated channel 134 which overlies the loader slide and is pivoted thereto for vertical swinging movement. The slide has an upright frame 136 composed of a pair of laterally spaced uprights 137 connected at the top by cross-plates 138, and a pivot pin 141 extends between and is carried by the uprights 137. The axis of the pin is transverse to the direction of movement of the loader slide and rotatably carries a mounting block 142 carried by the outer end of the channel 134. The inner end of the channel 134 carries a fork-shaped work support 144 which is adapted to straddle the spindle assembly 20 in the inner or operative position of the loader illustrated in FIG. 7. The work holder is raised and lowered by a hydraulic piston-cylinder assembly 150 carried by the cylinder support 151 mounted on the slide 112. The cylinder is disposed vertically above the work holder and the rod 152 extending from the piston thereof is connected to a bearing 153 rotatably mounted on a pin 154 carried by a support 155 on the channel 134 of the work holder.

In the retracted position of the loader, the work holder is loaded with a pair of disks centered on the forked inner end thereof by the locating pins 156 and the work holder is elevated to the dotted line position of FIG. 7 prior to movement to operative position relative to the spindle assembly. When the loader reaches the inner or operative position, it is lowered to the solid line position of FIG. 7 to deposit the pair of blanks on the spindle, and then retracted to its outer limit whereupon the work holder is again elevated.

The unloader is of the same construction as the loader although its movements are different. The unloader moves from the retracted position of FIG. 6 inwardly to an operative position in which its forked inner end straddles the work supporting spindle 20. During this time the work holder is in the lower position but is elevated when it reaches the operative position to lift the pair of rolled disks from the spindle. Thereupon the unloader is retracted to the outer limit of FIG. 7 and again lowered. The rolled disks are then removed by any available means.

The loader 110 has associated with it three limit switches LS1, LS2 and LS10. The limit switch LS1 is carried by the loader slide in position to be operated by a dog 170 on the pivoted work holder 135. Limit switch LS1 has contacts LS1a and LS1b. When the work holder is up, LS1a is closed and LS1b is open and when the work holder is down the contacts of the limit switch reverse. Limit switch LS2 is carried by the fixed frame of the loader to be engaged by a dog 177 on the loader slide. The dog engages and operates the limit switch in both directions of movement of the loader slide at an intermediate point in its movement. LS2 is opened when the loader moves in and closed when the loader moves out. The limit switch LS10 is operated by a dog 179 on the loader slide when the loader is moved inwardly to its loading position. When the loader is in the inner or operative position, limit switch LS10 is closed by the dog and held closed until initial retraction movement of the loader takes place.

The unloader 111 has associated with it the limit switches LS7, LS8 and LS9. Limit switch LS7 is carried by the fixed frame of the unloader and is operated by a dog 181 on the unloader slide when the unloader is moved inwardly to its operative position. The limit switch has two contacts LS7a and LS7b. Limit switch LS7b is closed when the unloader is in operative position, and limit switch LS7a is open. Those contacts reverse upon initial outward movement of the unloader. Limit switch LS8 is carried by the loader slide in position to be engaged by a dog 184 on the pivoted work holder. The limit switch has a pair of contacts LS8a and LS8b. When the work holder is up LS8b is closed and LS8a is open, and the contacts reverse when the work holder is down. Limit switch LS9 is carried by the fixed frame of the unloader and is operated by a dog 185 on the loader slide. The limit switch is operated by the dog in both directions of movement of the slide at an intermediate point in the movement thereof. LS9 is opened when the unloader moves in and closed when it moves out.

The limit switches LS2 and LS9 are of the maintained contact type, that is they remain closed or open after operation thereof.

The double-acting hydraulic cylinder 131 for operating the loader has fluid lines 190 and 191 leading to opposite ends thereof from a 4-way valve 192 controlled by solenoids 1S1 and 1S2. When solenoid 1S1 is operated, the valve is shifted to direct hydraulic fluid to the cylinder through line 190 and to exhaust line 191 to move the loader in. The valve is reversed when solenoid 1S2 is operated to move the loader out. Hydraulic fluid under pressure is admitted to the valve through the line 194 and exhausted through line 195. The hydraulic cylinder 131 for the unloader has hydraulic lines 197 and 198 leading to opposite ends thereof from the 4-way valve 200 controlled by solenoids 7S1 and 7S2. Hydraulic fluid is admitted to the valve through line 201 and exhausted through line 202. When solenoid 7S1 is operated, the valve is shifted to admit hydraulic fluid to line 198 and exhaust line 197 to move the unloader in, and operation of solenoid 7S2 reverses the valve to move the unloader out.

The hydraulic cylinder 150 for raising and lowering the work holder of the loader has lines 210 and 211 leading to the opposite ends thereof from 4-way valve 212 controlled by solenoids 2S1 and 2S2. Hydraulic fluid under pressure is admitted to the valve through line 213 and exhausted through line 214. When solenoid 2S1 is operated, the valve is shifted to direct hydraulic fluid to line 211 and to exhaust line 210 raising the work holder, and operation of solenoid 2S2 reverses the valve to lower the work holder. The hydraulic cylinder 150 for raising and lowering the work holder of the unloader has lines 217 and 218 leading to opposite ends thereof from a 4-way valve 220 controlled by solenoids 8S1 and 8S2. Hydraulic fluid under pressure is admitted to the valve through line 222 and exhausted through line 223. When solenoid 8S1 is operated it shifts the valve to direct fluid under pressure through line 218 and to exhaust line 217 to raise the work holder, and when solenoid 8S2 is operated the valve is reversed to lower the work holder.

The hydraulic cylinder 36 for operating the hold-down shoe has fluid lines 230 and 231 leading to opposite ends thereof from a 4-way valve 232 operated by solenoids 9S1 and 9S2. Hydraulic fluid under pressure is admitted to the valve by line 235 and exhausted by line 236. When solenoid 9S1 is operated, the valve is shifted to admit hydraulic fluid under pressure to line 231 and line 230 is exhausted to raise the hold-down shoe, and when solenoid 9S2 is operated the valve is reversed to lower the shoe for engagement with the disks D on spindle 20.

Let it be assumed that a pair of disks have been loaded on the spindle assembly 20 and the hold-down shoe is in engagement with the disks, and the rolling units are in their inner positions for engagement with the disks in a rolling operation. The unloader is fully retracted to its outer position with its work holder down and the loader is in its inner position in which it straddles the spindle. The work holder of the loader is down, having deposited the disks on the spindle, to close limit switch LS1b. Since the hold-down shoe is in the down position, LS11 is closed thereby energizing relay 21CR to close its contact 21CRA in circuit 240. Hence relays 1CR and 1CRA are energized. Energization of relay 1CR closes its contact 1CR1 in circuit 241 to energize loader solenoid 1S2 effecting a withdrawal of the loader to its retracted position. Relay 1CR also has a contact 1CR3 in a circuit by-passing LS1b so that the circuit 240 remains closed after the loader opens LS1b on its upward movement. The contact 1CR2 of relay 1CR in circuit 242 is also closed to energize relay SRR which has a contact SRR1 to seal in the circuit to the relay. The relay also has a contact SRR2 in circuit 245 which closes to energize relay 1BR to release a mechanical brake on the spindle armature 253.

The power unit 29 for driving the spindle assembly 20 is diagrammatically shown in FIG. 13 and includes a constant speed electrically driven motor 250. The motor drives the armature 251 of the spindle generator at constant speed and the field of the spindle generator is indicated at 252. The spindle motor armature is indicated at 253 and its field at 254. The armature 253 is connected to the gear unit 28 to drive the spindle 20. The relay 1BR has a contact 1BR1 in circuit 246 to energize relay 1M. The relay has a contact 1M1 in the circuit to the armature 253 to accelerate it rapidly and correspondingly accelerate the disks carried by the spindle assembly. Relay 2VR across the spindle generator armature is operated when more than 30 volts is put out by the spindle generator to close its contact 2VR1 in circuit 255, and contact 1M2 in this circuit is also closed.

When the loader initially moves outward from its inner or operative position, limit switch LS10 is opened to de-energize relay 20CR opening its contact 20CR1 to de-energize relay 10CR. When the loader moves further, it closes limit switch LS2 which thereafter remains closed, energizing relay 12CR. This relay has a contact 12CR1 which closes to energize relay 2CR. Relay 2CR has a contact 2CR1 in the circuit to the solenoid 2S1 of the loader which is effective to raise the work holder thereof to its upper position. As a result LS1b is opened and LS1a is closed.

The wedges of the rolling mill are then operated to engage the driven rolls with the rotating disks and the roll units are moved outwardly to progressively taper the disks in a rolling operation. During this time, the spindle generator may, if desired, be regulated to adjust the motor current downward to approximately 75% of full when the rolls take over. When the rolls reach the periphery of the disks, the limit switch LS6 is operated by the rolling units closing the circuit 260 and energizing relays 6CR1 and 6CR2. Energization of relay 6CR2 opens its contact 6CR2' in circuit 242 to de-energize relay SSR. Relay 6CR1 has a contact 6CR1' in the circuit to the unloader solenoid 7S1. Since the work holder of the unloader is down, limit switch LS8a is closed, and since the loader is clear of the mill relay 12CR is energized closing its contact 12CR2. Hence the circuit to the unloader solenoid 7S1 is closed starting the unloader in toward the mill spindle to unload the rolled disks.

De-energization of relay SRR opens its contact SRR2 in circuit 245 so the relays 1BR and 1M are maintained through circuit 255. The circuit to the spindle generator field 252 has another contact SRR3 which opens up on the de-energization of the relay SRR requiring the circuit to the field to travel through the resistance R. This decreases the generator output so that the spindle armature 253 feeds back to the generator and in effect tries to run the generator armature faster than the drive motor 250 is running it and thus receives opposition or regeneration braking. The armature spindle also operates a tachometer and as the armature slows down the tachometer increases the resistance in the spindle generator field circuit, thus adjusting the generator output downward ahead of the decrease in speed of the motor spindle armature to a point where the generator output is about 30 volts and running quite slow. At this point, relay 2VR across the spindle generator armature drops out thereby opening contact 2VR1 in circuit 255, de-energizing relays 1BR and 1M. The relay 1M has a normally open contact 1M1 in the spindle motor armature circuit which now opens and a normally closed contact 1M3 in the circuit 261 across the spindle armature so that further regenerative braking of the spindle motor armtaure through the circuit 261 and resistance 17R is obtained. When relay 1BR is de-energized it operates a mechanical brake for the spindle motor armature 253 to bring it to a halt.

Relay 1BR also has a normally closed contact 1BR3 in circuit 262 which now closes to energize the time delay relay 2TDR which has a contact 2TDR1 which, after a predetermined time delay, closes the circuit to relay 2TDCR. This latter relay has a contact 2TDCR1 in the circuit to the unloader solenoid 8S1 for elevating the work holder of the unloader. Thus a time delay is introduced to make sure that the spindle is fully stopped before the unloader lifts the rolled disks from the spindle. When the unloader is all the way in, it operates limit switch LS7 to close LS7B to energize relay TCR. Its contact 7CR4 closes by-passing the limit switch LS7b. Its contact 7CR1 closes in the circuit to the "unloader-up" solenoid 8S1. The relay 9CR is de-energized when the unloader is in to close its contact 9CR1 so that the circuit to the "unloader-up" solenoid is completed through timer contact 2TDCR1. Relay 9CR is opened by the contact 19CR1 of relay 19CR which is de-energized by the opening of limit switch LS9 which takes place when the unloader operates it on its inward movement.

Thus it will be seen that when the rolls have completed the rolling of the disks, the work spindle 20 is braked and the unloader moves in. The time delay relay 2TDR assures that the spindle is fully stopped before the unloader, at its inner limit, lifts the disks from the spindle.

The relay 2TDCR, operated by the time delay relay, has a second contact 2TDCR2 in the circuit to the solenoid 9S1 for raising the hold down assembly. This circuit also has a contact 7CR1 operated by its relay 7CR when the unloader reaches the "in" position to close limit switch LS7b. Hence the hold down shoes is raised simultaneously with the raising of the unloader. Actually the hold down assembly slightly precedes the loader because it is operated by a smaller cylinder. Both however are actuated at the same time. When the hold down shoes rises, it opens LS11 de-energizing relay 21CR opening contact 21CRa in circuit 240 and thereby de-energizing relays 1CR and 1CRa.

When the unloader is all the way up and has lifted the disks from the spindle, it operates the limit switch LS8 to close switch LS8b and open switch LS8a. Closing of switch LS8b energizes relay 8CR closing its contact 8CR1 in the circuit to solenoid 7S2 which is effective to move the unloader outwardly. "Unloader-in" solenoid 7S1 is de-energized by the opening of LS8a. The unloader moves out past limit switch LS9 closing the latter thereby operating relay 19CR which has a contact 19CR1 in the circuit to relay 9CR. This relay has a contact 9CR1 in the circuit to the solenoid 8S2 which operates to move the work holder of the unloader down. This solenoid is not energized however until the unloader reaches its fully retracted position closing limit switch LS15.

Going back somewhat, when the unloader reached its full "in" position, it energized relay 7CR which has a contact 7CR2 in the circuit 265 of timer T2. The timer T2 has a contact T2' in the circuit to the "loader-in" solenoid 1S1. When the time delay of the timer expires, contact T2' closes to complete the circuit to the "loader-in" solenoid. The loader will begin to move in with the disks to be rolled in the next operation. The circuit is through the limit switch LS1a which is closed because the work holder of the loader is up, through contact 12CR2 which is closed and through contact 1MR which is closed at all times during the operation of the machine. The loader will continue to move in until it operates and opens limit switch LS2 to de-energize relay 12CR and open its contact in the "loader-in" solenoid circuit. The loader will then stop unless the unloader has at that time retracted sufficiently, about 20", to release limit switch LS7 and close LS7a in the circuit 270. Normally the unloader will have retracted sufficiently so that there is no interruption in the movement of the loader. Thus the loader begins its inward movement a predetermined period, determined by timer T2, after the unloader reaches its "in" position. The time delay interval is selected so that the loader may move in without interno interruption in the movement of the olader. This normally the loader will begin its inward movement before the unloader has retracted clear of the work spindle, but before the loader reaches a point where interference might occur, the unloader has had time to retract out of the way. The possibility of interference is avoided by the safety circuit for stopping the loader described.

The loader moves all the way in to close limit switch LS10 operating relay 20CR and through its contact 20CR1 operating relay 10CR. Relay 10CR has a contact 10CR4 in the circuit of "loader-down" solenoid 2S2 which closes to energize the latter. Thus the work holder of the loader is lowered to deposit the disks on the spindle 20. The "loader-up" solenoid was previously de-energized by the opening of contact 2CR1 of relay 2CR which was de-energized by contact 12CR1 when its relay 12CR was de-energized by the opening of LS2.

The relay 10CR has a contact 10CR2 which is normally closed but now opens to de-energize relay 7CR. As a result, the solenoid 9S1 is de-energized by the opening of contact 7CR1 in its circuit and the solenoid 9S2 is energized by the closing of contact 10CR3. Energization of the latter solenoid moves the hold down shoe down to press the disks firmly on the spindle 20. Such movement of the hold down shoe closes LS11 to energize relay 21CR closing its contact 21CRa in circuit 240. The circuit 240 relays 1CR and 1CRa is again closed through LS1b which closed when the work holder of the loader moved down. The rolls units are moved inwardly and the apparatus is conditioned for another cycle of operation.

What I claim as my invention is:

1. Loading and unloading apparatus for a work support comprising means for unloading work from said support including an unloader, means for moving said unloader to and from a work transfer position adjacent said support, means for loading work on said support including a loader movable to and from said transfer position, means operated by the movement of said unloader for initiating movement of said loader toward said transfer position prior to full withdrawal of said unloader from said transfer position so that said loader will arrive at said transfer position after full withdrawal of said unloader from said transfer position, control means for interrupting said loader at an intermediate point in its movement toward said transfer position, and means responsive to the withdrawal of said unloader far enough to clear said transfer position before said loader reaches said intermediate point for rendering said control means inoperative so that said loader can move without interruption to said transfer position.

2. Loading apparatus for loading work on a support comprising a loader including a slide movable along a fixed path toward and away from said support, a work holder mounted on said slide for vertical movement, said work holder having a fork-shaped end portion provided with spaced upwardly extending pins adapted to locate work thereon, means operative when said work holder is in a raised position for moving said slide toward said support to an advance position in which the fork-shaped end portion of said work holder is above said support, means for moving said work holder to a lowered position in which said fork-shaped end portion as well as the pins thereon are beneath said support in the advance position of said slide to transfer work on said work holder to said support, and means for retracting said slide from said advance position and for returning said work holder to said raised position.

3. Unloading apparatus for unloading work from a support comprising an unloader including a slide movable along a fixed path toward and away from said support, a work holder mounted on said slide for vertical movement, said work holder having a fork-shaped end portion provided with spaced upwardly extending pins adapted to locate work thereon, means operative when said work holder is in a lowered position for moving said slide toward said support to an advance position in which the fork-shaped end portion of said work holder as well as the pins thereon are beneath said support, means for moving said work holder to a raised position above said support in the advance position of said slide to lift work from said support onto said fork-shaped end portion of said work holder and to locate the work thereon by said pins, and means for retracting said slide from said advance position and for returning said work holder to said lowered position.

References Cited in the file of this patent

UNITED STATES PATENTS

| | | |
|---|---|---|
| 478,795 | Hummel | July 12, 1892 |
| 1,136,275 | Roehrich | Apr. 20, 1915 |
| 1,664,393 | Bixler et al. | Apr. 3, 1928 |
| 1,665,823 | Smith | Apr. 10, 1928 |
| 1,683,368 | Nelson | Sept. 4, 1928 |
| 1,739,854 | Nelson | Dec. 17, 1929 |
| 1,993,754 | Smith | Mar. 12, 1935 |
| 2,040,028 | Smith et al. | May 5, 1936 |
| 2,382,339 | Skowron | Aug. 14, 1945 |
| 2,402,452 | Schreiber | June 18, 1946 |
| 2,404,228 | Hamlin | July 16, 1946 |
| 2,406,219 | Hight | Aug. 20, 1946 |
| 2,496,000 | Bugenhagen | Jan. 31, 1950 |
| 2,541,574 | Crooks | Feb. 13, 1951 |
| 2,653,502 | Meyer | Sept. 29, 1953 |
| 2,763,229 | Sahlin | Sept. 18, 1956 |
| 2,811,266 | Udal | Oct. 29, 1957 |
| 2,856,079 | Watter | Oct. 14, 1958 |
| 2,881,929 | Giffen | Apr. 14, 1959 |
| 2,924,051 | More | Feb. 9, 1960 |
| 2,943,750 | Sehn | July 5, 1960 |